(12) United States Patent
Lessmann et al.

(10) Patent No.: US 10,644,956 B2
(45) Date of Patent: May 5, 2020

(54) PRE-SCHEDULED AND PRE-CONFIGURED TIME-DEPENDENT BULK REROUTING IN TRANSPORT NETWORKS

(71) Applicant: NEC LABORATORIES EUROPE GMBH, Heidelberg (DE)

(72) Inventors: Johannes Lessmann, Sandhausen (DE); Yong Cheng, Kornwestheim (DE)

(73) Assignee: NEC CORPORATION, Tokyo (JP)

(*) Notice: Subject to any disclaimer, the term of this patent is extended or adjusted under 35 U.S.C. 154(b) by 94 days.

(21) Appl. No.: 15/742,073

(22) PCT Filed: Jul. 9, 2015

(86) PCT No.: PCT/EP2015/065717
§ 371 (c)(1),
(2) Date: Jan. 5, 2018

(87) PCT Pub. No.: WO2017/005328
PCT Pub. Date: Jan. 12, 2017

(65) Prior Publication Data
US 2018/0176090 A1 Jun. 21, 2018

(51) Int. Cl.
*H04L 12/717* (2013.01)
*H04L 12/24* (2006.01)
*H04L 12/751* (2013.01)
*H04L 12/725* (2013.01)

(52) U.S. Cl.
CPC .......... *H04L 41/0896* (2013.01); *H04L 41/12* (2013.01); *H04L 41/147* (2013.01); *H04L 41/5022* (2013.01); *H04L 45/02* (2013.01); *H04L 45/302* (2013.01); *H04L 41/0886* (2013.01); *H04L 41/0893* (2013.01); *H04L 45/42* (2013.01)

(58) Field of Classification Search
None
See application file for complete search history.

(56) References Cited

U.S. PATENT DOCUMENTS

| | | | |
|---|---|---|---|
| 2004/0022823 A1* | 2/2004 | Uchida | A61K 8/23 424/401 |
| 2004/0228323 A1* | 11/2004 | Acharya | H04L 45/00 370/351 |
| 2007/0147256 A1* | 6/2007 | Pichot | H04L 45/00 370/238 |

OTHER PUBLICATIONS

Y. Watanabe; T. Oda: "Dynamic routing schemes for international networks", IEEE Communications Magazine, vol. 28, No. Oct. 10, 1990 (Oct. 1990), pp. 70-75, XP11416736.

* cited by examiner

*Primary Examiner* — Cai Y Chen
(74) *Attorney, Agent, or Firm* — Leydig, Voit & Mayer, Ltd.

(57) ABSTRACT

A method for performing bulk rerouting in a transport network includes pre-computing routing paths for traffic between multiple source-destination pairs for different time slots and pre-computing an order in which changes of the routing paths are carried out across different time slots, pre-provisioning the routing paths and the order to the respective forwarding network nodes, and generating free network resources according to predefined rules that take into consideration traffic preemption and exploiting the free network resources to bootstrap and/or to facilitate a rerouting sequencing of routing path switching and/or swapping in bulk rerouting across different time slots.

14 Claims, 4 Drawing Sheets

PRE-SCHEDULED AND PRE-CONFIGURED TIME-DEPENDENT BULK REROUTING IN TRANSPORT NETWORKS

CROSS REFERENCE TO RELATED APPLICATION

This application is a U.S. National Stage Application under 35 U.S.C. § 371 of International Application No. PCT/EP2015/065717 filed on Jul. 9, 2015. The International Application was published in English on Jan. 12, 2017 as WO 2017/005328 A1 under PCT Article 21(2).

FIELD

The present invention relates to a method and a system for performing bulk rerouting in a transport network.

BACKGROUND

Figure 1A:
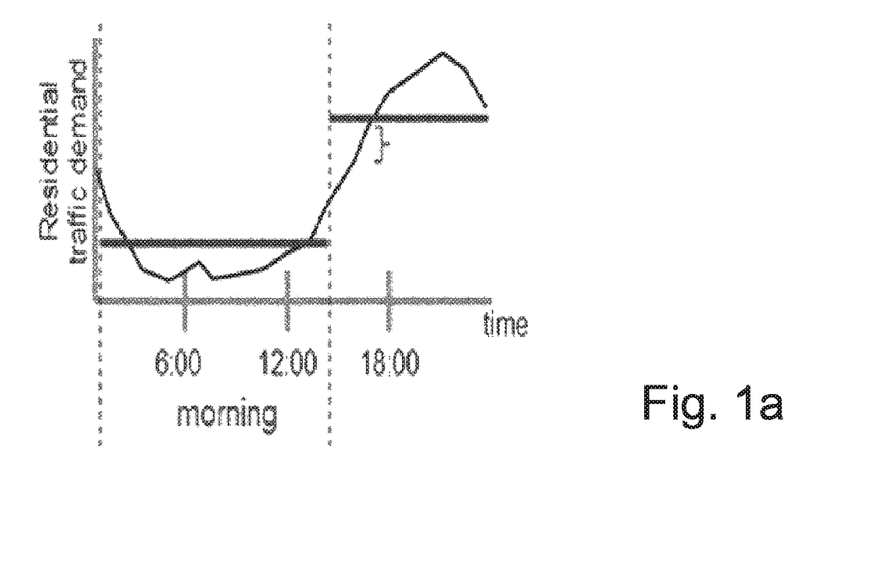
FIGS. 1a and 1b are diagrams illustrating time-varying traffic demands in cellular backhaul networks.
Figure 1B:
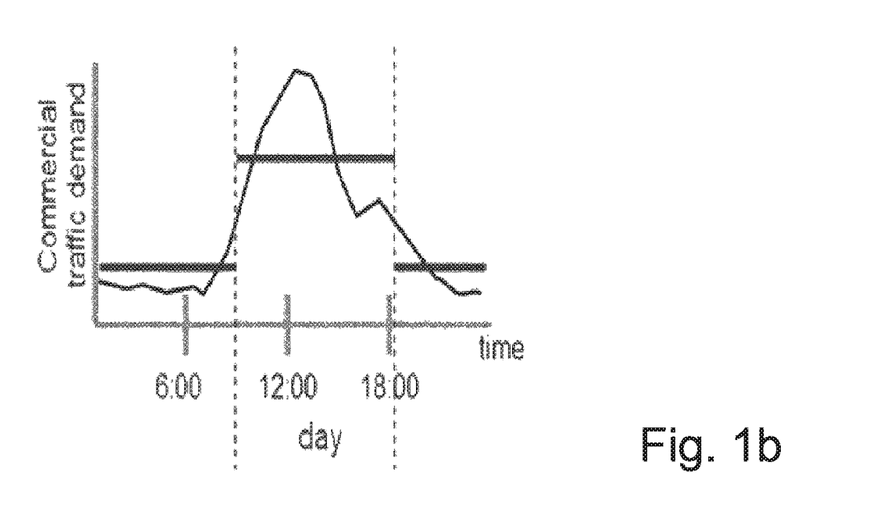

Traffic demands in transport networks (e.g., mobile backhaul networks) are time-varying and, typically, the traffic load variations are reappearing following certain patterns. For example, as shown in FIG. 1, the traffic demands of cellular backhaul networks in residential areas (FIG. 1a) and in commercial areas (FIG. 1b) change over time during one typical working day and this variation is usually repeated following the same pattern on every working day (for reference see, for instance, Juha Salmelin, and Esa Metsälä, "Mobile Backhaul," John Wiley & Sons, May, 2012).

Such time-varying traffic demands can be characterized with multiple traffic demand matrices of different time slots during one day. The multiple traffic matrices can be obtained based on historic data and/or traffic prediction from statistical traffic models. Tab. I and Tab. II below show two sample traffic matrices for a number of routers Ri for two different quality-of-service (QoS) classes in an n-th time slot. Generally, the network traffic may be categorized into a hierarchy of traffic classes (i.e., differentiated services specified by different QoS requirements).

TABLE I

Example of traffic matrix in nth time slot - QoS class #1.

| From | To | | | | | |
| --- | --- | --- | --- | --- | --- | --- |
|  | R1 | R2 | R3 | R4 | R5 | R6 |
| R1 | — | — | 15 Mbps | 30 Mbps | 45 Mbps | — |
| R2 | 20 Mbps | 55 Mbps | 30 Mbps | — | — | 10 Mbps |
| R3 | — | — | — | 35 Mbps | 25 Mbps | — |
| R4 | 15 Mbps | 40 Mbps | 40 Mbps | — | — | 30 Mbps |
| R5 | 25 Mbps | 35 Mbps | — | 30 Mbps | — | — |
| R6 | 30 Mbps | — | 55 Mbps | — | 35 Mbps | — |

TABLE II

Example of traffic matrix in nth time slot - QoS class #2.

| From | To | | | | | |
| --- | --- | --- | --- | --- | --- | --- |
|  | R1 | R2 | R3 | R4 | R5 | R6 |
| R1 | — | — | 25 Mbps | 50 Mbps | 70 Mbps | — |
| R2 | 30 Mbps | — | 50 Mbps | — | — | 15 Mbps |
| R3 | — | — | — | 30 Mbps | 60 Mbps | — |
| R4 | 20 Mbps | 30 Mbps | 20 Mbps | — | — | 20 Mbps |
| R5 | 15 Mbps | 25 Mbps | — | 40 Mbps | — | — |
| R6 | 70 Mbps | — | 45 Mbps | — | 30 Mbps | 40 Mbps |

Figure 2:
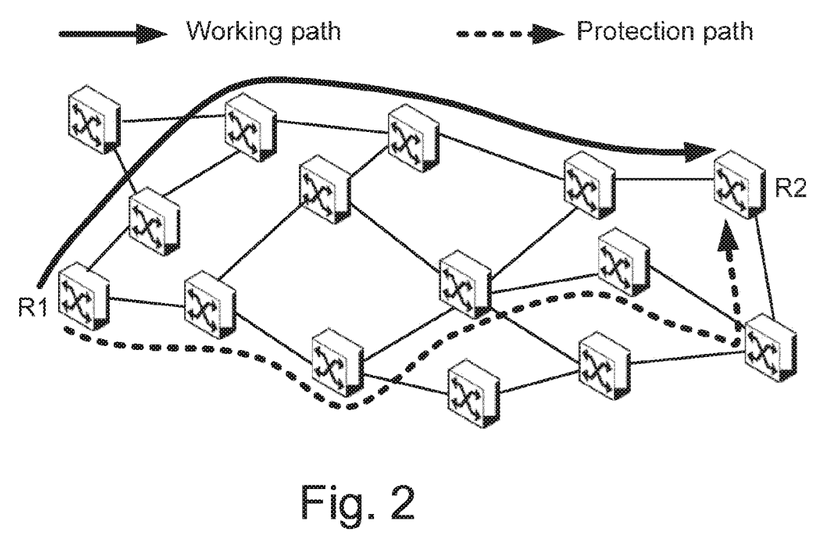
FIG. 2 is a schematic view illustrating working and protecting paths between routers R1 and R2 of a mobile backhaul network in an n-th time slot.
Figure 3:
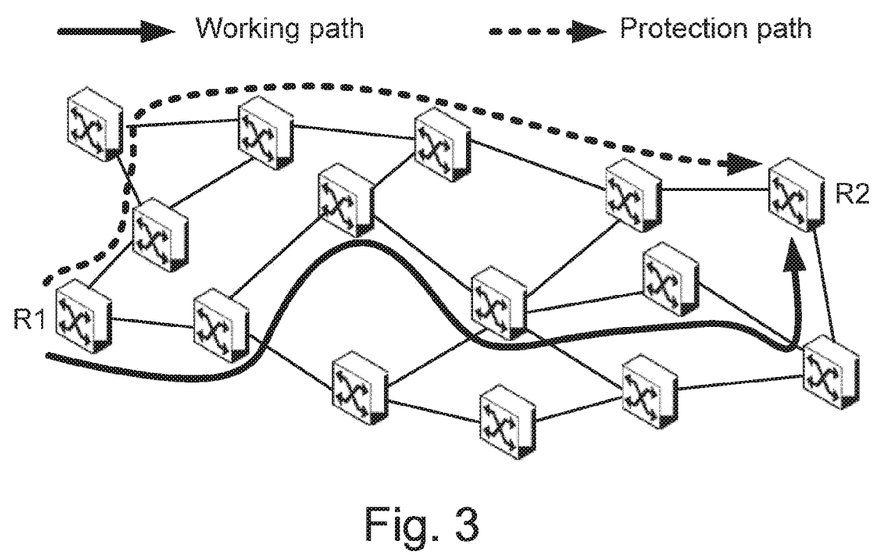
FIG. 3 is a schematic view illustrating working and protecting paths between the routers R1 and R2 of FIG. 2 in an (n+1)-th time slot.

To accommodate the multiple traffic matrices of different time slots in transport networks, time-dependent (re)routing schemes are adopted in practice. FIGS. 2 and 3 together show an example of time-dependent (re)routing for a single source-destination pair, with router R1 being the source node and router R2 being the destination note. When there are multiple source-destination pairs (as is the case, for example, in realistic mobile networks), the routing paths established for most of the source-destination pairs have to be changed (re-configured) across different time slots. This is called Bulk Rerouting, as a bulk of traffic demands (e.g., a bulk of VLANs) are rerouted across different time slots.

While time-dependent routing achieves increased link utilization and network throughput under time-varying traffic demands, the re-provisioning of the routing paths to the routers and switches across different time slots may take too much time and may incur too much signaling overhead and therefore cause significant service disruptions (for reference see, for instance, Jean-Philippe Vasseur, Mario Pickavet, and Piet Demeester: "Network Recovery: Protection and Restoration of Optical, SONET-SDH, IP, and MPLS" in Morgan Kaufmann Publishers Inc., August, 2004). To minimize the transition impact, which can be measured in terms of packet loss, jitter, video quality degradation, etc., bulk rerouting shall be carried out in a pre-scheduled manner. That is, all the time-dependent routing paths of different time slots are pre-configured and pre-provisioned to the routers/switches, and the bulk rerouting is performed according to the pre-established schedule (e.g., a pre-established time-dependent routing table).

When the network nodes are perfectly synchronized, bulk rerouting can be carried out at the boundaries of different time slots in an atomic way. That is, when the network is perfectly synchronized, the traffic between multiple source-destination pairs can be switched to new paths simultaneously at the boundaries of different time slots, according to the pre-established bulk rerouting schedules, e.g., time-dependent routing tables (for reference see, for instance, Y. Watanabe, and T. Oda: "Dynamic routing schemes for international networks", in IEEE Communications Magazine, vol. 28, no. 10, pp. 70-75, October 1990).

In reality, however, the network nodes (e.g., gateways, routers, switches, etc.) are not perfectly synchronized. For example, even with the Precision Time Protocol (PTP) as specified in the standard IEEE 1588v2 (for reference see, Jean-Loup Ferrant, and Mike Gilson, et. al. "Synchronous Ethernet and IEEE 1588 in Telecoms: Next Generation Synchronization Networks," John Wiley & Sons, June, 2013, as well as Symmetricom: "Synchronization for Next Generation Networks—The PTP Telecom Profile," White Paper, 2011), accuracy of network synchronization will typically be in the order of a few microseconds (μs). With a transmission rate (line speed) of 100 Gbps, a mere 1 μs difference in timing between two network nodes may cause the loss (or misrouting or out of order delivery) of about 100 of kilobits traffic for one source-destination pair alone.

In summary, in practical transport networks with imperfect network synchronization, bulk rerouting cannot be performed in an atomic way without incurring packet loss. One way to address this problem is by carefully sequencing the switch-over of services to their new configuration one by one. However, this can become difficult if the network is close to saturation, since in such case there will be a chicken-and-egg problem of freeing resources first before other services can be rerouted.

SUMMARY

In an embodiment, the present invention provides a method for performing bulk rerouting in a transport network. The method includes pre-computing routing paths for traffic between multiple source-destination pairs for different time slots and pre-computing an order in which changes of the routing paths are carried out across different time slots, pre-provisioning the routing paths and the order to the respective forwarding network nodes, and generating free network resources according to predefined rules that take into consideration traffic preemption and exploiting the free network resources to bootstrap and/or to facilitate a rerouting sequencing of routing path switching and/or swapping in bulk rerouting across different time slots.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods and systems for performing bulk rerouting in a transport network in such a way that the transition impact (e.g. in form of packet losses, jitter, video quality degradation, etc.) and service disruption are reduced when employing bulk rerouting in practical transport networks with imperfect synchronization.

In accordance with an embodiment of the invention, a method for performing bulk rerouting in a transport network is provided, the method comprising pre-computing routing paths for traffic between multiple source-destination pairs for different time slots and pre-computing an order in which changes of the routing paths of said source-destination pairs are carried out across different time slots, pre-provisioning said routing paths and said order to the respective forwarding network nodes, and generating free network resources according to predefined rules that take into consideration traffic preemption and exploiting said free network resources to bootstrap and/or to facilitate the rerouting sequencing of routing paths switching and/or swapping in bulk rerouting across different time slots.

Furthermore, in accordance with another embodiment of the invention, a system for performing bulk rerouting in a transport network is provided, the system comprising a paths computation and pre-scheduling engine that is configured to pre-compute routing paths for traffic between multiple source-destination pairs for different time slots and an order in which changes of the routing paths of said source-destination pairs are carried out across different time slots, an interface adapted for pre-provisioning said routing paths and said order to the respective forwarding network nodes, and a control entity that is configured to generate free network resources according to predefined rules that take into consideration traffic preemption and to exploit said free network resources to bootstrap and/or to facilitate the rerouting sequencing of routing paths switching and/or swapping in bulk rerouting across different time slots.

According to embodiments of the invention, the transition impact and the service disruption occurring in bulk rerouting procedures can be reduced by pre-configuring/pre-provisioning pre-computed time-dependent routing paths into the network equipment (i.e. into the respective forwarding network nodes, e.g. including the source node and destination node as well as the forwarding network nodes along the routing path between the source node and the destination node) and by exploiting particular network resources, e.g. link capacity, for facilitating or bootstrapping paths swapping/switching in bulk rerouting across different time slots. This proves to be particularly beneficial when the network is operated close to saturation, since it allows to circumvent the chicken-and-egg problem. According to embodiments of the invention these particular ("exploited") network resources are specified or determined according to predefined rules that take into consideration traffic preemption. As a result, embodiments or the present invention provide for reduced transition impact during bulk rerouting and of a relaxed requirement of network synchronization.

According to an embodiment of the invention, a method is provided for reducing transition impact (e.g., packet loss, jitter, video quality degradation, etc.) and service disruption of bulk rerouting and for increasing link utilization and network throughput by:

a) pre-configuring/pre-provisioning routing paths between multiple source-destination pairs of different time slots to the network equipment (e.g., routers and switches);

b) pre-computing the order in which the changes of routing paths of different source-destination pairs are carried out across different time slots; and c) exploiting the link capacity reserved for pre-emptible (e.g. low QoS requirements) traffic to facilitate paths swapping/switching in bulk rerouting across different time slots.

According to embodiments of the invention, forwarding network nodes can include switches, for instance SDN (Software Defined Network) switches, routers and/or gateways. In order to enable decision-making on the basis of a comprehensive information base, it can be provided that the paths computation and pre-scheduling engine is configured to retrieve information from a topology database, from a path database and/or from traffic demand matrices. The control entity may be implemented as part of the transport network's NMS, Network Management System, or as part of the paths computation and pre-scheduling engine, for instance in form of an SDN controller, or as a separate entity that comprises interfaces to communicate and interact with the paths computation and pre-scheduling engine.

According to embodiments of the invention, the link capacity reserved for pre-emptible traffic may be used for generating the free network resources. The term "pre-emptible" can be a relative term that is regulated by the relative priority of different QoS classes in the network. For instance, it may be provided that at least two QoS classes with different priorities are defined within the network. In this case, the pre-emptible traffic may include traffic of only the lowest QoS class or traffic of two or more of the lowest QoS classes. More generally, the pre-emptible traffic may be defined by applying a traffic preemption hierarchy based on the relative priorities of the different QoS classes in the network. Alternatively or additionally to using resources reserved for pre-emptible traffic, resources reserved for backup paths (sometimes also denoted protection paths) may be used for bootstrapping a bulk rerouting procedure.

According to embodiments of the invention, the pre-computation of routing paths can be performed by taking into consideration the traffic demand captured in the form of traffic demand matrices for each time slot. The traffic demand matrices may be constructed for each time slot based on historic traffic data and/or based on traffic predictions using statistical models.

According to embodiments of the invention, the bulk rerouting can be supported by making use of pre-established schedules of a forwarding mechanism that are pre-installed in the forwarding network nodes. For instance, the forwarding mechanism maybe based on using VLANs, Virtual Local Area Networks, or MLSP LSPs, Multiprotocol Label Switching Label Switched Paths. In case of using VLAN, the forwarding network nodes may be pre-provisioned with a table mapping VLAN configurations to time slots. According to embodiments it may be provided that a VLAN configuration is activated at a forwarding network node by triggering the VLAN configuration at an ingress port of the forwarding network node. To ensure that each packet encounters consistent VLAN configurations along its way through the network, packet tagging may be used, i.e. packets receive an additional tag that indicates the "time slot" (and thus the VLAN configuration) to be used for forwarding this packet.

Figure 4:
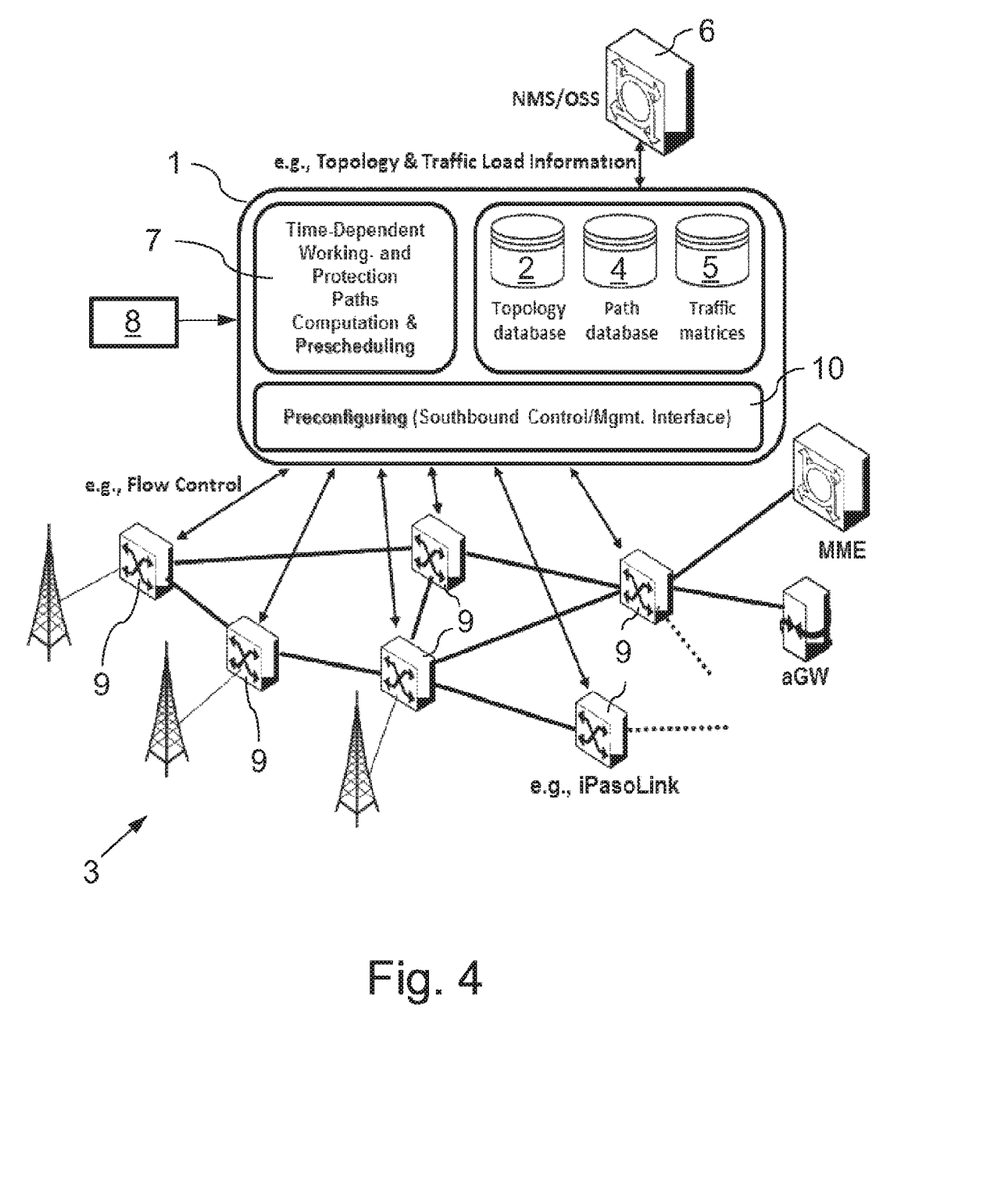
FIG. 4 is a schematic view illustrating a basic architecture of a system in accordance with an embodiment of the present invention.

A possible system architecture in accordance with an embodiment of the present invention is depicted in FIG. 4. An integral part of the system according to this embodiment is a centralized management component 1, for instance a Backhaul Resource Manager BRM, with a topology database 2 storing the topology of a transport network, which in the illustrated scenario is assumed to be a wireless backhaul network 3, and a path database 4 storing the currently allocated paths, as well as traffic matrices 5 indicating traffic demands (potentially differentiated by QoS class) in each time slot.

The centralized management component 1 may be implemented as a logical functional entity and could physically be part of the NMS (Network Management System) 6 or an independent entity. In any case, all database information is fed to a paths computation and pre-scheduling engine 7 or, more precisely, the paths computation and pre-scheduling engine 7 information from the databases 2, 4 and 5, as required. The pre-scheduled and pre-configured time-dependent bulk rerouting procedure, which will be described in detail hereinafter, can be carried out under some specific policies and configurations 8. Computed working and protection paths as well as additional information related to the bulk rerouting procedure can be provisioned to the switches/routers 9 of the wireless backhaul network 3 via a southbound control interface 10 or via the NMS 6 directly.

Generally, FIG. 4 relates to an embodiment for pre-scheduled (pre-ordered) and pre-configured time-dependent bulk rerouting in a wireless backhaul network 3 that is assumed to have imperfect synchronization. Here, "pre-scheduled" refers to the pre-established time and order in which the routing paths associated with the multiple source-destination pairs are changed across different time slots in bulk rerouting. As a first step of the bulk rerouting procedure, multiple traffic matrices 5 for different time slots are captured based on historic data and/or predictions. In this regard the illustrated embodiment assumes that the dynamic traffic demands of a transport network can be obtained from historic data and/or can be estimated.

In a next step, for both minimizing the transition impact (e.g. packet loss, jitter, video quality degradation, etc.) and maximizing performance-related TE metrics, the following two steps are jointly computed: i) paths for pre-emptible (e.g., best-effort) and non-pre-emptible (e.g., premium) traffic demands in each time slot, and ii) the sequence in which paths of different source-destination pairs are changed across different time slots, taking the various priorities and means (e.g. by shaping or transcoding) for pre-emptibility into account, as will be further explained below. To compute time-dependent working- and protection paths (if applicable) and to optimally pre-schedule the time and order in which the paths are changed/swapped across different time slots, the paths computation and pre-scheduling engine 7 makes use of information from topology database 2, path database 4, and traffic demand (potentially differentiated by QoS class) captured in the form of traffic matrices 5 in each time slot Next, the computed sequence in which paths of different source-destination pairs are changed across different time slots is stored in the NMS 6 or in another control entity implemented, e.g., in form of an SDN controller. Furthermore, the computed working paths (and protection paths, if applicable) are provisioned/preconfigured into network equipment, i.e. switches 9 and routers (which are assumed to support the preconfiguration of time dependent paths/routing tables). This may be done directly or via the southbound control/management interfaces 10. The paths provisioning/pre-configuration step can be implemented in such a way that it avoids to store entries for time slots where no routing change happens. Furthermore, the step can be implemented by using VLAN schedules so that a control entity realized in form of an SDN controller only needs to signal the ingress router to enforce the sequencing of bulk rerouting.

Generally, the term "pre-emptible" (or "non-pre-emptible") as used above is meant to be a relative term which is regulated by the hierarchy and the relative priority/importance of the different QoS classes in the network. Policies to define what resources/traffic to preempt/not preempt with which priority can be defined in accordance with the respective requirements and application scenarios, for instance by the operators themselves. If there are three QoS classes, for example, say, voice, video and best effort traffic, initially our system would probably try to make use of best effort capacity to make room for path swapping. However, if such a measure would not be enough to successfully bootstrap or accomplish the rerouting sequencing, or if it was considered undesirable to fully squeeze the best effort capacity to zero in order to make enough free capacity available, an option could be to also reduce the capacity reserved for video traffic, e.g. by shaping the video traffic to a smaller bitrate or by intelligently transcoding the video to a lower-bitrate version. In this example, there is a clear preemption hierarchy: first best effort, then video. In more general terms, the hierarchy could also be: first reduce best effort traffic by x %, then reduce video traffic by y %, and only if still not sufficient, reduce best effort traffic by another z % (or start also reducing voice traffic). As will be easily appreciated by those skilled in the art, however, the present invention does not pose any requirements on the specific preemption strategy, but wants to point out that there are multiple ways available to bootstrap the bulk rerouting by making capacity temporarily available.

In the above description, the backup capacity, i.e. the capacity/resources reserved for backup/protection paths, was repeatedly given as one example for "pre-emptible" traffic. While protected traffic (i.e. traffic that has an associated primary and backup path) is typically very important (i.e. premium) traffic and as such by definition generally not pre-emptible, it is a fact that, as long as the primary path does not fail, the backup path will not be actually needed. In fact, in many operator networks, the resources reserved for the backup path are opportunistically reused by best effort traffic most of the time. Hence, for the sake of bootstrapping a bulk rerouting procedure at slot boundaries, it will generally not be a problem at all to temporarily (e.g. for some milliseconds or even seconds) use the capacities reserved for backup paths in the network. This is why it is acceptable to subsume backup capacity under "pre-emptible" traffic.

As already mentioned above, the pre-scheduled and pre-configured bulk rerouting can be supported by making use of pre-established VLAN (or other forwarding mechanism, e.g. LSP, Label Switching) schedules that are pre-installed in the switches. In order to avoid excessive signaling to each involved switch in the network to establish new VLAN configurations, switches could be provided a "VLAN schedule", i.e. a table mapping VLAN configurations to time slots. This means that switches can locally know the VLAN configuration for each time slot in advance without the need to explicitly update them at each slot boundary again. All that needs to be done to activate a new VLAN configuration is to trigger that new configuration at an ingress switch. In other words, by using VLAN schedules to pre-provision time-varying forwarding information, the need to dynamically signal new forwarding configurations at each slot boundary to each switch in the network is effectively avoided.

To ensure that each packet encounters consistent VLAN configurations along its way through the network, packet tagging (also known as versioning) can be used, i.e. packets receive an additional tag that indicates the "time slot" (and thus the VLAN configuration) to be used for forwarding this packet. Since intermediate switches know the VLAN forwarding information for all time slots in advance by virtue of their VLAN schedules, upon receiving a packet they just need to look up the corresponding VLAN configuration based on the packet's time slot tag. This way, a one-by-one sequencing of VLAN reconfigurations (=bulk rerouting) can be easily enforced by just talking to the ingress switches. This procedure works with full forwarding consistency at the slot boundaries while not assuming any synchronization accuracy in the network.

Figure 5:
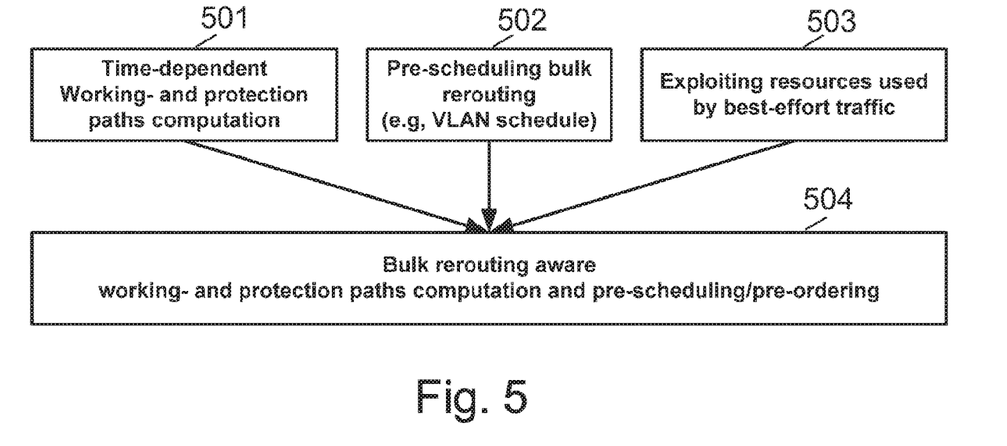
FIG. 5 is a diagram illustrating method steps for performing bulk rerouting in a transport network in accordance with an embodiment of the present invention.

FIG. 5 is a diagram illustrating method steps for performing bulk rerouting in a transport network in accordance with an embodiment of the present invention, for instance by using the system architecture of FIG. 4. In addition to the common traffic engineering performance metrics (e.g., network throughput and link utilization ratio), this embodiment further considers minimizing the overall transition impact (e.g., packet loss, jitter, video quality degradation, etc.) and service disruption of bulk rerouting across different time slots. As shown in FIG. 5, the time-dependent bulk rerouting scheme according to this embodiment includes the following components and enabling techniques:

As shown at 501, time-dependent working path (and additionally, if applicable, protection paths) are computed, e.g. by means of the paths computation and pre-scheduling engine as shown in FIG. 4. Furthermore, as shown at 502, the path changes of multiple source-destination pairs are pre-scheduled/pre-ordered, i.e. bulk rerouting is pre-scheduled. This step can be performed by using, e.g., VLAN schedules. Still further, as shown at 503, pre-emptible network resources, e.g. resources reserved for best-effort traffic or the link capacity reserved for protection/backup paths—which is typically either unused or temporarily reused by pre-emptible low QoS traffic—is exploited to bootstrap and/or to facilitate routing paths switching and/or swapping in bulk rerouting across different time slots. Based on all above steps 501-503, a joint optimization of the working path (and protection path, if applicable) computation and pre-scheduling/pre-ordering of bulk rerouting is realized, as shown at 504.

Figure 6:
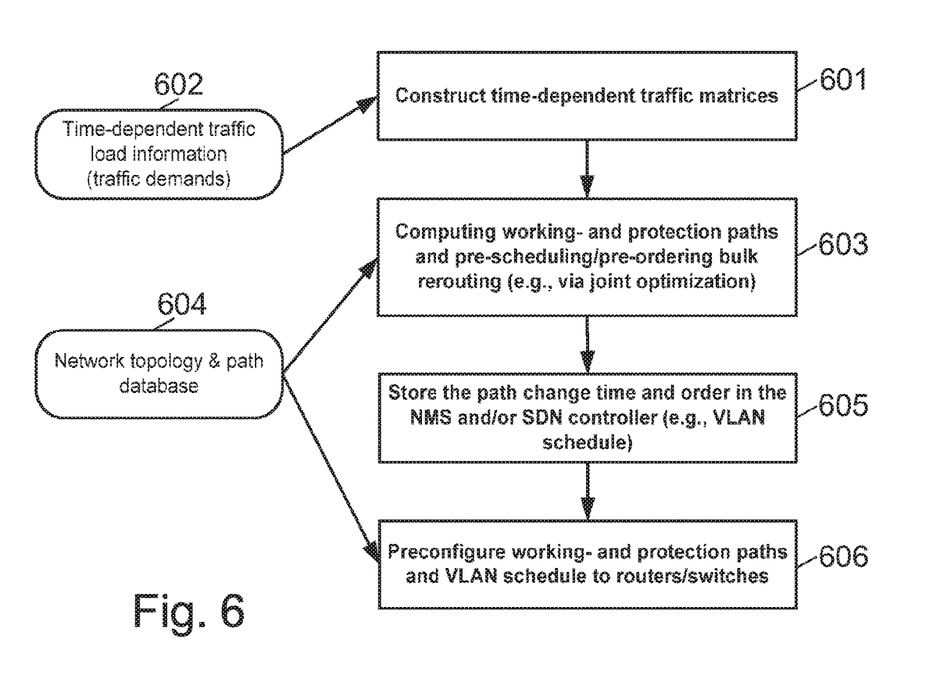
FIG. 6 is a diagram illustrating method steps for performing bulk rerouting in a transport network in accordance with another embodiment of the present invention.

FIG. 6 illustrates a method for pre-scheduled and pre-configured time-dependent bulk rerouting in a transport network in accordance with an embodiment of the present invention. As shown in FIG. 6, according to this embodiment the method comprises the following operations:

As shown at 601, a traffic demand matrix is constructed for each time slot. This can be done by making use of time-dependent traffic load information, i.e. traffic demands, as shown at 602. Traffic demands may be determined based on historic data and/or traffic predictions using statistical models.

As shown at 603, working paths (and protection paths, if applicable) are computed for each traffic demand in the traffic matrices of each time slot. As shown at 604, this may be done by using information from the network topology database and path database, shown in FIG. 4. Furthermore, it may be taken into account that pre-emptible link capacity (e.g. capacity reserved for best-effort traffic and/or backup network resources) will be used for changing/swapping paths in bulk rerouting across different time slots.

Also shown at 603, the time and order in which the working paths (and protection paths, if applicable) of different source-destination pairs are changed across different time slots are pre-scheduled, that is pre-scheduling/pre-ordering of bulk rerouting is performed. The link capacity reserved for pre-emptible traffic (e.g., best effort traffic) is exploited in the path swapping/switching operation in order to circumvent the chicken-and-egg problem and bootstrap the reconfiguration process.

As shown at 605, the pre-established path change order is stored in a control entity, for instance in the NMS and/or in an SDN controller.

As shown at 606, the time-dependent working- and protection paths together with the paths change time and order (as determined in step 603), e.g. in form of VLAN schedules, are pre-configured/pre-provisioned into the network equipment (e.g., routers and switches). Again, this may be performed by using information from the network topology database and path database.

With respect to the operations mentioned above it should be noted that the paths computation and the paths change pre-ordering/pre-scheduling can possibly be jointly optimized. This means, that—within one time slot—performance related TE (Traffic Engineering) metrics such as utilization maximization are optimized, while—at slot boundaries—the transition impact is also minimized.

Regarding the feasibility and practical implementation of embodiments of the present invention, the following aspect should be noted: For instance, when (re)configuring VLANs over Carrier Ethernet in mobile backhaul networks, the path changes of multiple source-destination pairs (i.e., the change of VLANs) can be realized with stacked VLAN tagging, with path change performed in a one-by-one manner. If stacked VLANs are not supported by the network equipment, the set of paths (even across time slots) has to be computed in a way that avoids collisions of VLAN IDs. Since there is only a limited number (=4096) of VLAN IDs available, this might become problematic. However, the already mentioned VLAN schedule concept could allow a network equipment, e.g. a switch, to locally switch to a new VLAN configuration at a time slot boundary. This allows reusing colliding VLAN IDs in different time slots, thus alleviating the scarce ID problem.

Hereinafter, a greedy approach for jointly optimizing the path computation and pre-ordering of bulk rerouting across different time slots in accordance with an embodiment of the present invention will be described. In this context it is assumed that there are N time slots, Q traffic QoS classes, and M ingress-egress pairs. The original network graph is denoted by G. A reference implementation of this greedy approach includes the following operations:

The following operations (1)-(12) are executed for each timeslot n (n=1, 2, . . . , N): (1) For each ingress-egress pair (i,j), with (i,j=1, 2, . . . , M), a traffic pipe P(n,q,i,j) is defined with the given traffic demand. A "traffic pipe" in this embodiment is meant to be an end-to-end tunnel between source and destination with a certain capacity associated to it. (2) Node- or link-disjoint working and protection paths for pipe P(n,q,i,j) are computed with sufficient capacity. (3) Pipe P(n,q,i,j) is installed along the paths. (4) The obtained paths are recorded. These steps, i.e. steps (1)-(4) are executed for each traffic QoS class q (q=1, 2, . . . , Q). (5) A list, denoted by L, of all installed traffic pipes is generated, along with the obtained working and protection paths. (6) A copy of the network graph G is produced, which is denoted by G'. (7) The traffic pipe that has the most changes of the working and protection paths, as compared to the previous time slot, is identified in the pipe list L. This traffic pipe is denoted as P'. (8) The temporary paths that will be used for path switching of pipe P' on the copied network graph G' in time slot n is computed. (9) Pipe P' is recorded, along with the temporary paths. (10) Pipe P' is put into the list of processed pipes (denoted by R(n)) and the position of the pipe P" in that list is recorded. The position of pipe P' in the list R(n) specifies the order of path switching. (11) Pipe P' is removed from the pipe list L. (12) Operations go back to step (6) until all the changes of the working and protection paths are scheduled.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for performing bulk rerouting in a transport network, the method comprising:
pre-computing routing paths for pre-emptible and non-pre-emptible traffic between multiple source-destination pairs for different time slots and pre-computing a time and an order in which changes of the routing paths are carried out across different time slots,
pre-provisioning the routing paths and the pre-computed time and order to respective forwarding network nodes, and
generating free network resources according to predefined rules that take into consideration traffic preemption and exploiting the free network resources to bootstrap and/or to facilitate a rerouting sequencing of routing path switching and/or swapping in bulk rerouting across different time slots, wherein link capacity reserved for pre-emptible traffic and for backup paths is used for generating the free network resources.

2. The method according to claim 1, wherein at least two QoS classes with different priorities are defined within the transport network, wherein the pre-emptible traffic includes traffic of only the lowest QoS class or traffic of two or more of the lowest QoS classes.

3. The method according to claim 1, wherein the pre-emptible traffic is defined by applying a traffic preemption hierarchy based on relative priorities of different QoS classes in the network.

4. The method according to claim 1, wherein the pre-computation of routing paths is performed by taking into consideration traffic demand captured in the form of traffic demand matrices for each time slot.

5. The method according to claim 4, wherein the traffic demand matrices are constructed for each time slot based on historic traffic data and/or based on traffic predictions using statistical models.

6. The method according to claim 1, wherein the bulk rerouting is supported by making use of pre-established schedules of a forwarding mechanism that are pre-installed in the forwarding network nodes.

7. The method according to claim 6, wherein the forwarding mechanism is based on using Virtual Local Area Networks (VLANs) or Multiprotocol Label Switching (MLSP).

8. The method according to claim 7, wherein each of the forwarding network nodes is pre-provisioned with a table mapping VLAN configurations to time slots.

9. The method according to claim 6, wherein a VLAN configuration is activated at a forwarding network node by triggering the VLAN configuration at an ingress port of the forwarding network node.

10. The method according to claim 1, wherein packet tagging is performed by providing each packet with a tag that indicates a respective time slot.

11. A system for performing bulk rerouting in a transport network, the system comprising:
a paths computation and pre-scheduling engine configured to pre-compute routing paths for pre-emptible and non-pre-emptible traffic between multiple source-destination pairs for different time slots and to pre-compute a time and an order in which changes of the routing paths are carried out across different time slots, an interface adapted to pre-provision the routing paths and the pre-computed time and order to respective forwarding network nodes, and a controller configured to generate free network resources according to predefined rules that take into consideration traffic preemption and to exploit the free network resources to bootstrap and/or to facilitate a rerouting sequencing of routing path switching and/or swapping in bulk rerouting across different time slots, wherein link capacity reserved for pre-emptible traffic and for backup paths is used to generate the free network resources.

12. The system according to claim 11, wherein the forwarding network nodes include switches, routers and/or gateways.

13. The system according to claim 11, wherein the paths computation and pre-scheduling engine is configured to retrieve information from a topology database, from a path database, and/or from traffic demand matrices.

14. The system according to claim 11, wherein the controller is implemented as part of the paths computation and pre-scheduling engine or as part of a Network Management System (NMS) of the transport network.

* * * * *